UNITED STATES PATENT OFFICE.

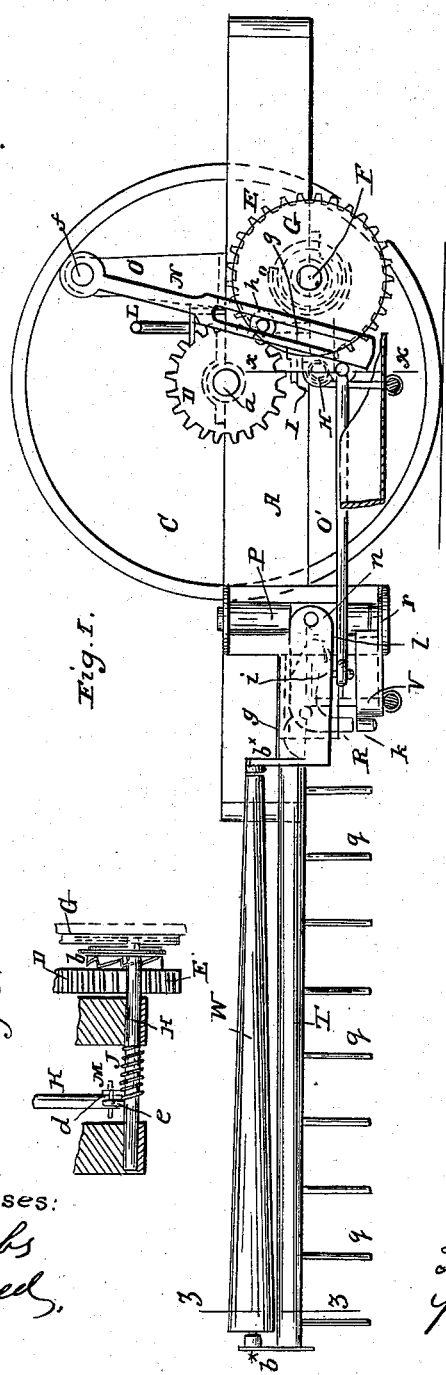

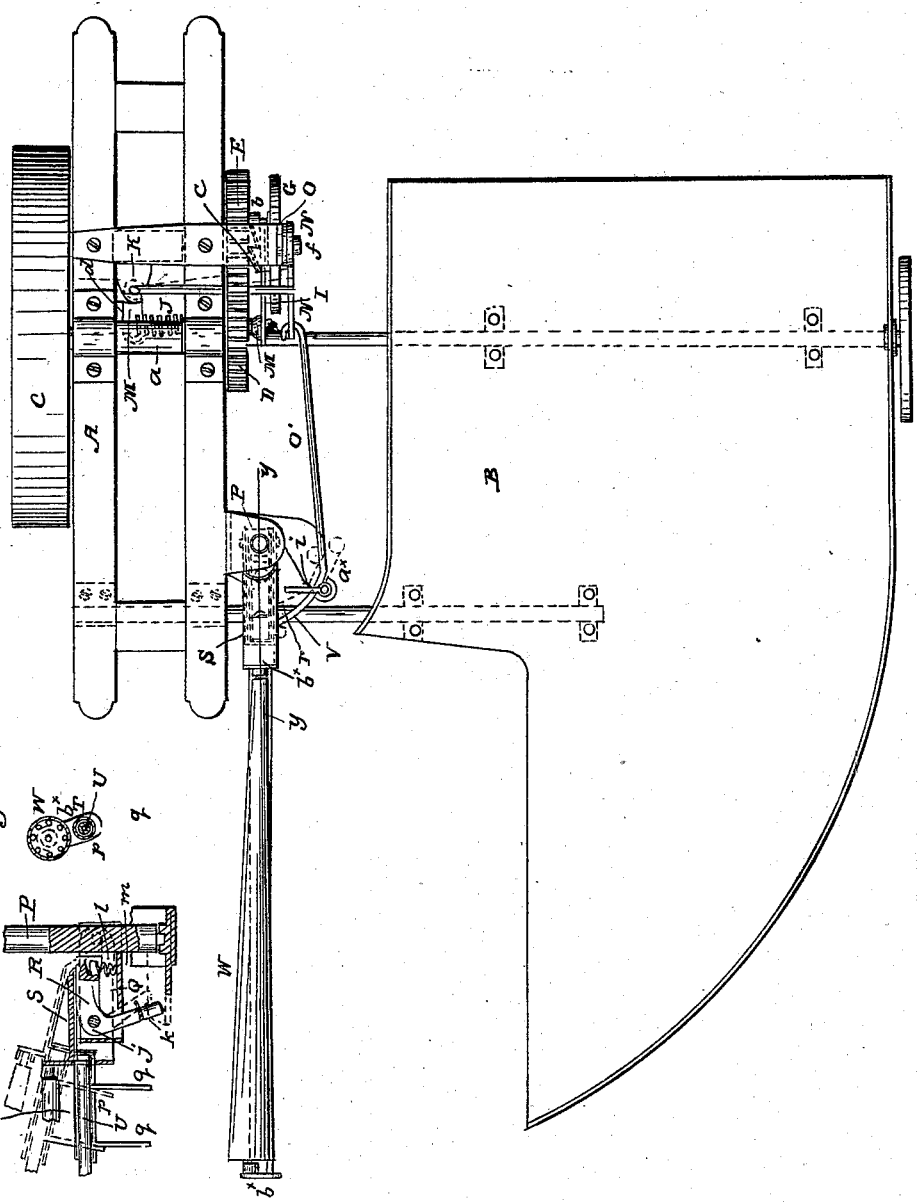
J. BALDWIN.
Harvester Rake.
No. 43,282.
2 Sheets—Sheet 2.
Patented June 28, 1864.

JOHN BALDWIN, OF ST. PARIS, OHIO.

IMPROVEMENT IN RAKES FOR HARVESTERS.

Specification forming part of Letters Patent No. 43,282, dated June 28, 1864.

*To all whom it may concern:*

Be it known that I, JOHN BALDWIN, of St. Paris, in the county of Champaign and State of Ohio, have invented a new and Improved Raking Device for Harvesters; and I do hereby declare that the following is a full, clear, and exact description of the same, reference being had to the accompanying drawings, making a part of this specification, in which—

Figure 1 is a side view of my invention applied to a harvester. Fig. 2 is a plan or top view of the same; Fig. 3, a vertical section of a portion of the same, taken in the line $x\ x$, Fig. 1; Fig. 4, a vertical section of a portion of the same, taken in the line $y\ y$, Fig. 2; Fig. 5, a vertical section of a portion of the same, taken in the line $z\ z$, Fig. 1.

Similar letters of reference indicate corresponding parts in the several figures.

This invention relates to a new and improved raking device, such as are commonly termed "automatic," for harvesters; and it consists in a novel means employed for operating the rake, as well as in a novel construction of the rake itself, whereby the cut grain may be raked from the platform in a perfect manner, gavels being laid or deposited on the ground in an even manner to facilitate the binding operation.

To enable those skilled in the art to fully understand and construct my invention, I will proceed to describe it.

A represents the main frame of a harvester, and B the platform, attached thereto in any proper way.

C is the driving-wheel, the axle $a$ of which has its bearing on the main frame A. This axle $a$ extends entirely across the main frame A, and has a pinion, D, on its inner end, which gears into a toothed wheel, E, placed loosely on a stationary shaft, F, in the main frame A. The toothed wheel E is connected by a clutch, $b$, with a crank-wheel, G, which is also placed loosely on the shaft F and allowed to slide thereon, so that it may be connected with and disconnected from the toothed wheel E. The wheel G, to which a portion of the clutch $b$ is attached, is moved on the shaft F by the following means:

H is a sliding shaft at the bottom of the main frame A; and I is an arm attached at right angles to the inner end of the shaft H, and provided with a forked end, $c$, which is fitted on the part of the clutch attached to the crank-wheel G. The shaft H has a spiral spring, J, upon it, which has a tendency to keep the two parts of the clutch $b$ connected or in contact with each other, the part of the clutch which is not attached to G being attached to the toothed wheel E.

K is an upright shaft in the main frame A.

L is a lever at its upper and M is a lever at its lower end, the latter having an oblong slot, $d$, made in it, through which a pin, $e$, attached to the shaft H, passes. By actuating the lever L the shaft H and arm I, and consequently the portion of the clutch attached to the crank-wheel G, may be moved, and the crank-wheel G disconnected from the toothed wheel E when desired.

N is a swinging arm, the upper end of which is connected by a pin or pivot, $f$, to the upper end of an upright, O, on the main frame A. This arm N has an oblong slot, $g$, in its lower part, through which a pin, $h$, attached to the crank-wheel G, passes, as shown clearly in Fig. 1.

O' is a pitman or connecting rod, one end of which is attached to the arm N and the opposite end to an arm, $i$, which projects horizontally from a vertical shaft, P, the bearings of which are at the inner side of the back part of the main frame A. The shaft P has an oblong rectangular box, Q, projecting horizontally from it, in which a bent lever, R, is secured by a pivot, $j$. The lower end of this bent lever has an anti-friction roller, $k$, attached to it, and its upper end bears upon a spiral spring, $l$, which rests on a plate, $m$, at the back part of the bottom of the box Q, the front part of the bottom of said box being open to allow the lower end of the bent lever R to pass through it.

S is a box, which is similar to the box Q, and encompasses the latter, and is secured to it and the shaft P by a pivot-bolt, $n$. The upper end of the box Q is open; but the box S is closed at its top.

To the box S there is attached a tube, T, in which the rake-head U is fitted. (See Fig. 4.) The under side of this tube T has a slot, $p$, made in it nearly its whole length for the teeth $g$ of the rake-head U to pass through, and the slot $p$ is of such a width as to admit of the teeth $g$ having a certain degree of play, as will be seen by referring to Fig. 5.

V is an upright segment-ledge, which is attached to a plate, $r$, connected to the lower bearing of the shaft P or to any suitable fixture. This segment-ledge V has an eccentric position with the shaft P, as will be seen by referring to Fig. 2, in which the red dotted lines $a^*$ show a concentric position.

W is a conical roller, which is directly over the tube T and has its bearings in plates $b^*$ at the ends of said tube.

The operation is as follows: As the machine is drawn along a rocking motion is communicated to the shaft P through the medium of the gearing, crank-wheel, swinging arm, and pitman described, and the rake is made to sweep forward and backward over the platform B. During the backward movement of the rake the teeth $g$ are down near the surface of the platform B; and the anti-friction roller $k$, at the lower end of the bent lever R, is at the outer side of the segment-ledge V, and works in contact therewith, which causes the upper end of said lever to force down and compress the spring $l$. When the rake reaches the termination of its backward movement the anti-friction roller $k$ is, by means of the spring $l$, forced within the ledge V and made to bear against the inner side of the same, and in consequence of the eccentric position of said ledge relatively with the shaft P the lever R, during the forward movement of the rake, has its upper end forced upward, which end, as it rises, acts against the top of the box S and elevates the tube T and the rake, so that the latter will be free from the platform. When the rake reaches the termination of its forward movement the anti-friction roller $k$ arrives at the front end of the segment-ledge V, and the rake drops by its own gravity, the roller $k$ passing to the front side of the ledge, against which it bears when the rake moves back. The grain is raked from the platform during the backward movement of the rake, and the play allowed the rake-teeth $g$ by the slot $p$ in tube T admits of the teeth being readily withdrawn from the grain, so as not to disarrange the same as it is discharged from the platform. The roller W receives the cut grain which falls when the rake is at the front part of the platform, and it holds or retains said grain in proper position, not allowing it to be disarranged while raking off that previously cut and below it. The roller W, it will be seen, rotates under the movement of the rake and the weight of the grain resting upon it, and the latter grain when the roller has passed from underneath it, falls in proper position on the platform.

The rake may be operated with a quicker or slower movement by having the pinion D and toothed wheel E changed in position, E placed on the axle $a$ and D placed on the shaft F.

Having thus described my invention, what I claim as new, and desire to secure by Letters Patent, is—

1. The crank-wheel G, connected with the toothed wheel E by means of the clutch $b$, the swinging arm N, pitman O', and shaft P, to which the rake is attached, all being arranged, as shown, to communicate a reciprocating motion to the rake, as set forth.

2. The bent lever R, in connection with the segment-ledge V, spring $l$, and shaft P, with the rake pivoted to the latter, and all arranged to operate in the manner substantially as and for the purpose specified.

3. The placing of the rake-head U in a tube, T, having a longitudinal slot, $p$, in its under side, substantially as and for the purpose set forth.

JOHN BALDWIN.

Witnesses:
 WM. L. MARSHALL,
 GEORGE BOOLE.